US011920659B2

United States Patent
Sessions

(10) Patent No.: US 11,920,659 B2
(45) Date of Patent: Mar. 5, 2024

(54) HIGH REDUCTION BELT-DRIVEN LINEAR ACTUATOR

(71) Applicant: Liftwave, Inc., Somerville, MA (US)

(72) Inventor: Blake Sessions, Somerville, MA (US)

(73) Assignee: Liftwave, Inc., Somerville, MA (US)

( * ) Notice: Subject to any disclaimer, the term of this patent is extended or adjusted under 35 U.S.C. 154(b) by 0 days.

(21) Appl. No.: 17/562,099

(22) Filed: Dec. 27, 2021

(65) Prior Publication Data

US 2022/0178424 A1 Jun. 9, 2022

Related U.S. Application Data

(63) Continuation of application No. 16/645,018, filed as application No. PCT/US2018/050257 on Sep. 10, 2018, now Pat. No. 11,255,416.

(60) Provisional application No. 62/555,944, filed on Sep. 8, 2017.

(51) Int. Cl.
*F16H 19/06* (2006.01)
*F16H 19/02* (2006.01)

(52) U.S. Cl.
CPC ....... *F16H 19/0618* (2013.01); *F16H 19/025* (2013.01); *F16H 19/06* (2013.01); *F16H 2019/0609* (2013.01); *F16H 2019/0668* (2013.01)

(58) Field of Classification Search
CPC .... F16H 19/025; F16H 19/06; F16H 19/0618; F16H 2019/0609; F16H 2019/0668
USPC ................ 74/89.22; 254/208, 214, 226, 242
See application file for complete search history.

(56) References Cited

U.S. PATENT DOCUMENTS

| 217,119 | A | * | 7/1879 | Laird ...................... B62C 5/04 |
| | | | | 278/4 |
| 222,742 | A | | 12/1879 | Schofield |
| 3,044,312 | A | | 1/1962 | Hall et al. |
| 4,272,997 | A | | 6/1981 | Groth |
| 6,134,978 | A | | 10/2000 | Lin |
| 8,714,524 | B2 | | 5/2014 | Bacon |

(Continued)

FOREIGN PATENT DOCUMENTS

| DE | 4342500 | 6/1995 |
| DE | 102009001667 | 10/2009 |

(Continued)

OTHER PUBLICATIONS

FR 3002404 A1 (Yves Noirot) Sep. 7, 1990 (full text). [online] [retrieved on Apr. 21, 2023]. Retrieved from Clarivate Analytics. (Year: 1990).*

(Continued)

*Primary Examiner* — Joseph Brown
(74) *Attorney, Agent, or Firm* — Fish & Richardson P.C.

(57) ABSTRACT

Disclosed herein are methods, systems, and components for the design of a flat belt based block and tackle design that is theoretically free of fleet angles. A mapping technique forms a set of planar positions for the centerlines of the free spans that provides a plurality of sheave geometries, which reside on a common axis and spans that are free of fleet angles at the sheave engagement interfaces. This permits the use of high-performing flat belts in high-reduction block and tackle topologies, with the principal benefits of an extended service life, high power transmission efficiency, more effective traction power transfer, and a compact machine design.

6 Claims, 22 Drawing Sheets

(56) References Cited

U.S. PATENT DOCUMENTS

| | | |
|---|---|---|
| 11,255,416 B2 | 2/2022 | Sessions |
| 2007/0219031 A1* | 9/2007 | Jones ................. F16H 19/06 |
| | | 474/148 |
| 2015/0027249 A1 | 1/2015 | Sessions |
| 2015/0122062 A1 | 5/2015 | Kawauchi |
| 2015/0184443 A1* | 7/2015 | Sakai ................. E05F 15/627 |
| | | 74/89.22 |
| 2017/0002905 A1 | 1/2017 | Sessions |
| 2020/0256436 A1 | 8/2020 | Sessions |

FOREIGN PATENT DOCUMENTS

| | | |
|---|---|---|
| EP | 3203115 | 8/2017 |
| FR | 2643963 | 9/1990 |
| FR | 2643963 A1 * | 9/1990 |
| JP | H02-084045 | 6/1990 |
| JP | H02-199345 | 8/1990 |
| JP | 2001-241525 | 9/2001 |
| JP | 2008-506546 | 3/2008 |
| UA | 67780 | 3/2012 |
| WO | WO 9531656 | 11/1995 |
| WO | WO 2019014259 | 1/2019 |
| WO | WO 2019051407 | 3/2019 |

OTHER PUBLICATIONS

Chilean Office Action in CL Appln. No. 76821, dated Dec. 9, 2020, 21 pages (with English translation).

Decision on Grant in Ukrainian Appln. No. a202002262, dated Feb. 17, 2022, 15 pages (with English Translation).

European Extended Search Report on EP Appln. No. 18854618.8, dated Apr. 26, 2021, 10 pages.

International Preliminary Report on Patentability in International Application No. PCT/US2018/050257, dated Mar. 19, 2020, 11 pages.

International Search Report and Written Opinion in International Application No. PCT/US2018/50257, dated Nov. 26, 2018, 17 pages.

Extended European Search Report in European Appln. No. 22204742.5, dated Jul. 13, 2023, 9 pages.

* cited by examiner

HIGH REDUCTION BELT-DRIVEN LINEAR ACTUATOR

CROSS REFERENCE TO RELATED APPLICATIONS

The present application is a continuation of U.S. patent application Ser. No. 16/645,018, filed Mar. 6, 2020, which is a 371 U.S. National Phase application of PCT/US2018/050257, filed on Sep. 10, 2018, which claims priority to U.S. Provisional Application No. 62/555,944 filed Sep. 8, 2017, the entirety of which applications are hereby incorporated herein by reference.

TECHNICAL FIELD

The present disclosure relates to the design of linear actuator systems powered by rotary motors and driven by modern steel-reinforced polyurethane flat belts.

BACKGROUND

Flat belts were invented to solve the issues that wire rope presents to wire-rope based elevator systems, such as their requirement for lubrication, relatively low traction potential, and low service life. Advances in materials science produced a rugged, durable polyurethane jacket that encloses multiple wire ropes that are run in a parallel arrangement, allowing the use of smaller traction drums while simultaneously increasing service life expectations by 3× or more. Steel-reinforced polyurethane belts are high performing, durable, and maintenance-free: A combination of traits that have rendered their rapid adoption across the elevator industry. They are now making their way into other oscillatory linear applications, such as scissor lifts, fork trucks, and gym equipment thanks to their ability to efficiently transmit power without maintenance for an extended period of time.

Care must be taken when designing systems that rely upon flat belts, as they are sensitive to fleet angle misalignments much like other reinforced belt constructions. Small amounts of fleet angle that would be otherwise perfectly acceptable to a wire-rope system are significantly more detrimental to belt-based systems. Rope-based block and tackle designs offer the benefit the benefit of mechanical reduction but introduce fleet angles to the reeving system, especially when reductions higher than 4:1 are necessary. Ropes are known for their tolerance to fleet angles, and thus have always performed well in such situations. Belts, on the other hand, cannot be easily applied to block and tackle topologies, as even the slightest of fleet angles is sufficient to substantially reduce expected system service life.

SUMMARY

In general, this disclosure relates to linear actuation systems that are configured for deployment with a flat belt system.

In one aspect of the disclosure, a linear actuator system includes an actuator chassis having a main drive axis. The system includes a first plurality of sheaves coupled respectively to a first shaft coupled to the actuator chassis. The first plurality of sheaves include sheaves having an axis of rotation that is coincident with the first shaft. The sheaves in the first plurality of sheaves are spaced apart from one another by non-constant spacing. The sheaves in the first plurality of sheaves have different sheave centerline diameters with respect to one another. The system includes a second plurality of sheaves coupled respectively to a second shaft coupled to the actuator chassis. The second plurality of sheaves include sheaves having an axis of rotation that is coincident with the second shaft. The sheaves in the second plurality of sheaves are spaced apart from one another by non-constant spacing, the sheaves in the second plurality of sheaves having different sheave centerline diameters with respect to one another. At least one of the first shaft and the second shaft are configured to translate along the main drive axis. The first shaft and the second shaft are positioned along the main drive axis and are offset with respect to one another by a static rotation angle about the main drive axis. Points at respective ends of line segments extending along a geometric centerline of each sheave in the first plurality of sheaves and the second plurality of sheaves lie along a common circular profile orthogonal to the main drive axis.

In certain implementations, the linear actuator system includes one or more of the following additional features. The linear actuator system may include a flat belt extending from a first termination point, to and about the first plurality of sheaves, to and about the second plurality of sheaves, and to a second termination point. The linear actuator system may include a driver configured to engage the flat belt. The driver may include an electric motor and/or one or more idler pulleys. The linear actuator system may include at least one an actuation shaft movably coupled to the actuator chassis to translate along the main drive axis. In some implementations, the designed geometric centerline of at least 6 sheaves pierces a common circular profile of a certain size, orthogonal to the main drive axis. Each sheave may have an axis of rotation that is coincident with its mating shaft.

In one aspect of the disclosure, a belt driven linear actuator system includes an actuator chassis and an actuation shaft movably coupled to the actuator chassis to translate along an axis. The system includes a first plurality of outer sheaves and a second plurality of outer sheaves coupled respectively to a first outer shaft and a second outer shaft. The first plurality of outer sheaves and the second plurality of outer sheaves are configured to rotate freely about the first outer shaft and the second outer shaft, respectively. The first outer shaft and the second outer shaft are rotatably coupled to the actuator chassis and laterally fixed with respect to the actuator chassis. The system includes a first plurality of inner sheaves and a second plurality of inner sheaves coupled respectively to a first inner shaft and a second inner shaft. The first plurality of inner sheaves and the second plurality of inner sheaves are configured to rotate freely about the first inner shaft and the second inner shaft, respectively. The first inner shaft and the second inner shaft are configured to translate along an axis in the actuator chassis to drive the actuation shaft. The system includes a flat belt extending from a first termination point, to and about: the first plurality of inner sheaves, the first plurality of outer sheaves, the second plurality of inner sheaves, and to a second termination point. The first outer shaft and the first inner shaft are tilted with respect to one another by a static rotation angle about the axis, and the second outer shaft and the second inner shaft are tilted with respect to one another by the static rotation angle about the axis so as to eliminate fleet angles.

In certain implementations, the belt driven linear actuator system includes one or more of the following additional features. The belt driven linear actuator system may include a redirection sheave coupled to the actuator chassis and configured to be coupled to a rotary actuator. The flat belt may extend from the first termination point, then to and about the first plurality of outer sheaves, then to and about the redirection sheave, then to about the second plurality of inner sheaves, then to and about the second plurality of outer sheaves, and then to a second termination point. The belt driven linear actuator system may include the rotary actuator. The rotary actuator may be configured to rotate back and forth. The actuator chassis may include a housing cover positioned about the actuator chassis and at least a portion of the actuation shaft may translate into and out of the housing cover. The first inner shaft and the second inner shaft may be configured to translate along the axis in the same direction, whereby a distance between the first plurality of outer sheaves and the first plurality of inner sheaves is configured to increase contemporaneously with a distance between the second plurality of outer sheaves and the second plurality of inner sheaves decreasing and whereby the distance between the first plurality of outer sheaves and the first plurality of inner sheaves is configured to decrease contemporaneously with the distance between the second plurality of outer sheaves and the second plurality of inner sheaves increasing. The first inner shaft and the second inner shaft may be configured to oscillate along the axis. The belt driven linear actuator system may include the rotary actuator coupled to the redirection sheave. Each of the first plurality of outer sheaves, the second plurality of outer sheaves, the first plurality of inner sheaves, and the second plurality of inner sheaves comprises sheaves may having different diameters. The sheaves having different diameters may be parallel to one another. The spacing between parallel sheaves may be non-constant. The spacing between parallel sheaves may decrease as the sheaves decrease in diameter. The belt driven linear actuator system may include thrust washers positioned between the sheaves to provide spacing between the parallel sheaves. The sheaves may decrease in diameter axially outward.

Certain aspects provide methods of driving a belt driven linear actuator system. The methods include energizing a rotary actuator coupled directly or indirectly to a flat belt according to one or more linear actuator system described herein.

Certain aspects provide methods of manufacturing a linear actuator system according to one or more linear actuator system described herein.

Disclosed herein are methods, systems, and components for the design of a flat belt based block and tackle design that is theoretically free of fleet angles. A mapping technique forms a set of planar positions for the centerlines of the free spans that provides a plurality of sheave geometries, which reside on a common axis and spans that are free of fleet angles at the sheave engagement interfaces. The present invention permits the use of high-performing flat belts in high-reduction (6:1 or greater) block and tackle topologies, with the principal benefits of an extended service life, high power transmission efficiency, more effective traction power transfer, and a compact machine design.

One or two belt-based block and tackle topologies are combined with a capstan drive, in certain implementations, to form an electric linear actuator that is driven by an electric motor. The electric linear actuator may be used in hydraulic replacement applications, in construction equipment, material handling equipment, and manufacturing machinery. These applications can include, but are not limited to, forklifts, stackers, dollies, man lifts, truck lifts, scissors lifts, motion simulation systems, and oil extraction equipment.

BRIEF DESCRIPTION OF THE DRAWINGS

The skilled artisan will understand that the drawing primarily is for illustrative purposes and is not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawing, like reference characters generally refer to like features (e.g., functionally similar and/or structurally similar elements).

DETAILED DESCRIPTION

Following below are more detailed descriptions of various concepts related to, and exemplary embodiments of, a block-and-tackle arrangement for use with flat belts.

Figure 1:
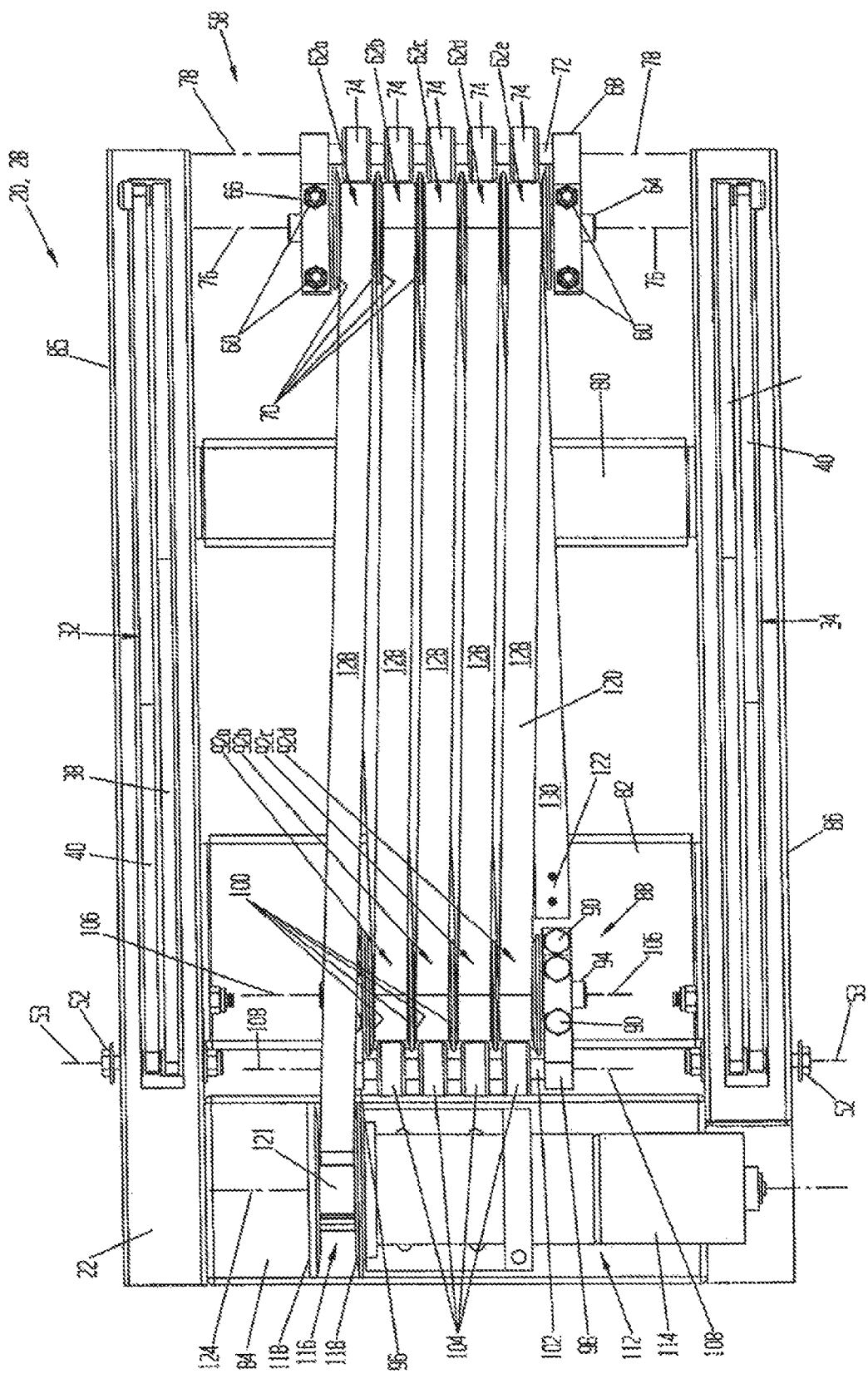
FIG. 1 illustrates the prior art, a block and tackle reduction drive driven by a reel system that contains fleet angles.

FIG. 1 illustrates a flat belt used in a conventional block-and-tackle topology described in U.S. Pat. No. 8,714,524 B2. Two parallel shafts 76 and 106 contain a plurality of sheaves over which a flat belt 120 is run. One end of the belt is fixed at a termination 122 while the other end of the flat belt is driven by a reel 121. All sheaves are free to rotate about their respective shafts with the exception of the reel, which is driven by the motor 114. The mechanical reduction as seen at the reel of such a system is significant and is equivalent to the number of free spans in the system, which in this instance is 10. Block-and-tackle methods are employed commonly with wire rope rather than with flat belts, due to the fleet angles ("kinks") in the belt that would occur at each of the sheave interfaces, caused by the fact that the free spans 128 are not horizontal. This non-ideal geometric situation results in either an asymmetric tension distribution within the reinforcing strands and/or sliding action between the belt and the sheave. Premature belt failure will occur due to sidewall abrasion and strand fatigue. The reeling system, which processes sections of the belt that are subjected to the highest number of bending cycles, is the most likely area for belt failure to occur. Not only are fleet angles present in this design, but they vary as the distance between the principal drive shafts 76 and 106 varies through the machine's range of travel. While this system may work in limited circumstances, the belt's performance, as measured by overall tension, sheave pressure, and service life will be compromised in comparison to a wire rope that is subjected to the same topology.

Figure 2:
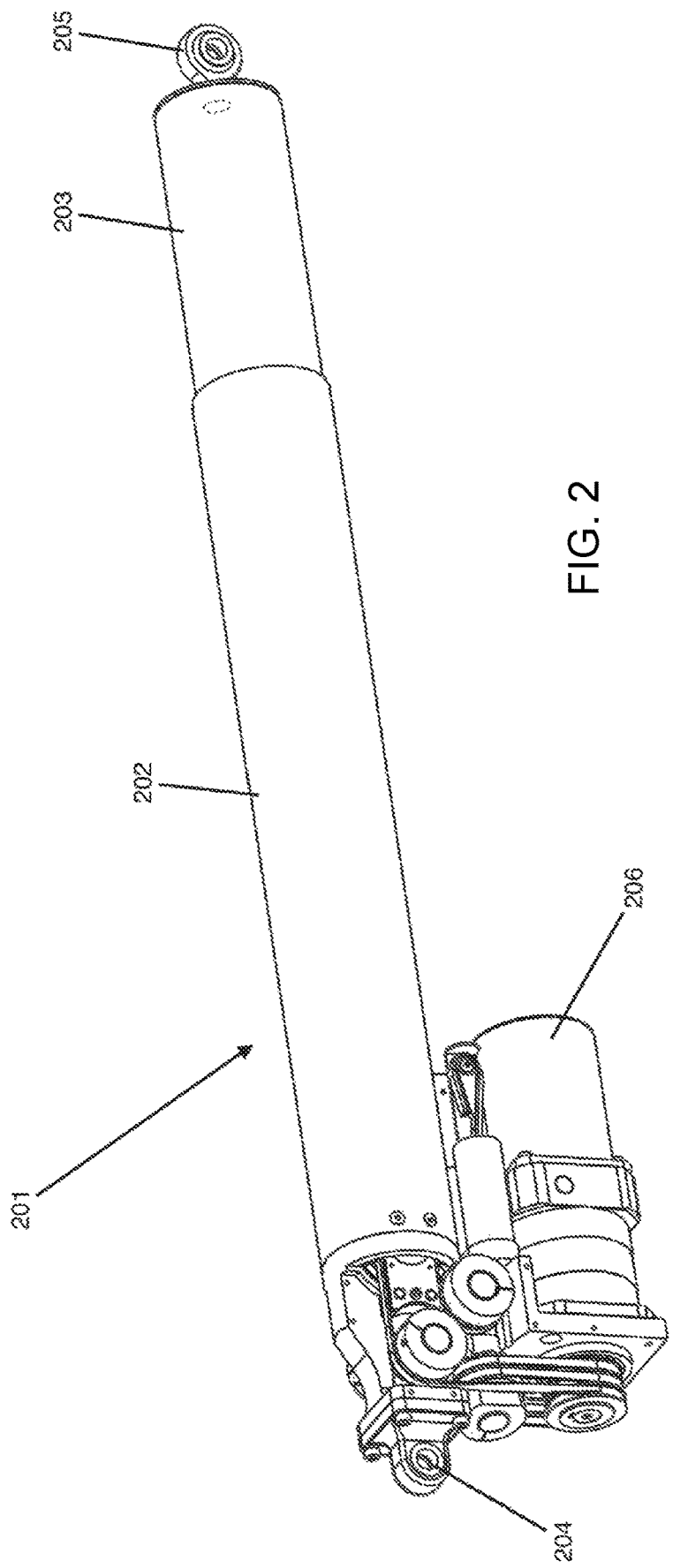
FIG. 2 depicts an isometric view of the linear actuator in its entirety.

FIG. 2 shows the overall form of the present invention. The actuator 201 consists of an outer chassis 202 which may be configured in the form of a housing body and a driving shaft 203 that extends and retracts with respect to the outer chassis, which may be retract, at least in part in the outer chassis 202. Mounting hardware 204 and 205 are positioned the outer chassis and the driving shaft 203, respectively, allowing power to be supplied to those points. The actuator is driven by a motor 206 (e.g., an electric motor).

Figure 3:
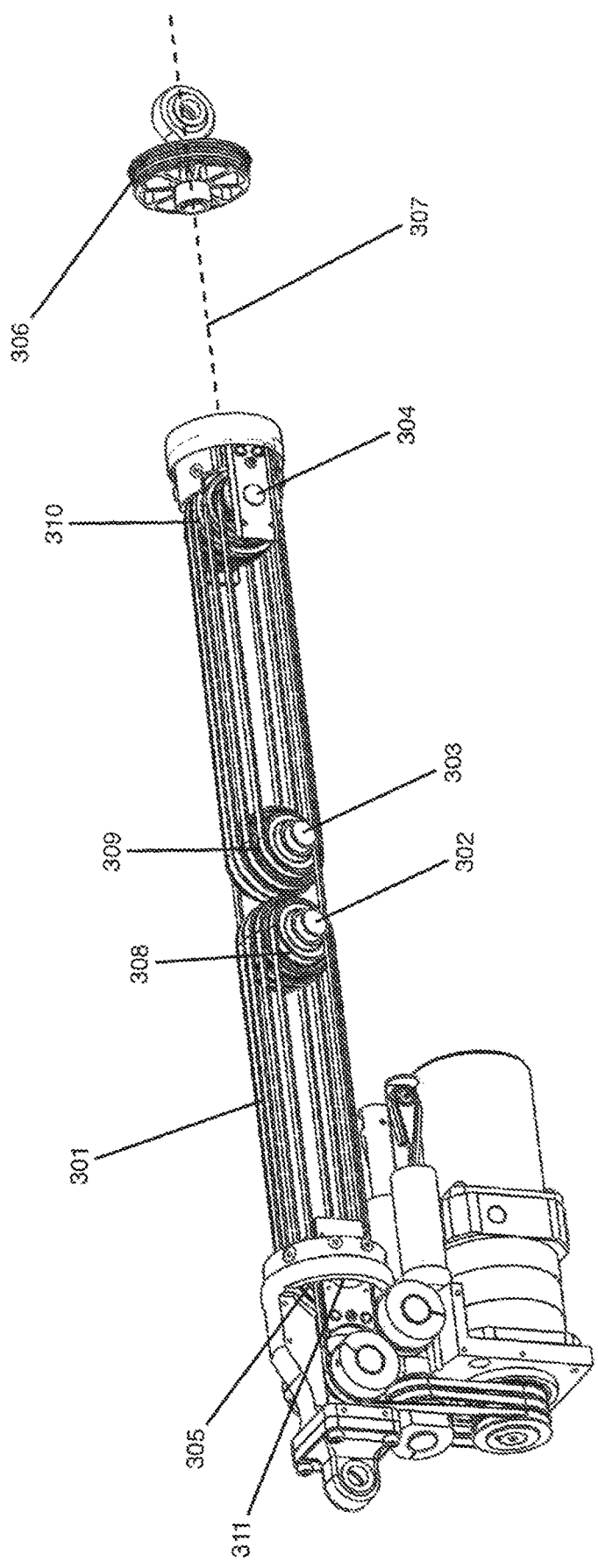
FIG. 3 shows an isometric view of the main drive elements of the belt-driven linear actuator.

FIG. 3 depicts the principal working elements of the actuator 201. A unitary flat belt 301 is run around four main pluralities of sheaves 308, 309, 310, and 311 that are rotatably coupled to four main drive shafts 302, 303, 304, and 305. The outer drive shafts 304 and 305 are fixed with respect to the chassis 202, while the inner drive shafts 302 and 303 are free to travel along the main axis 307 by the prismatic coupling created by the chassis 202 and the driving shaft 203.

Figure 4:
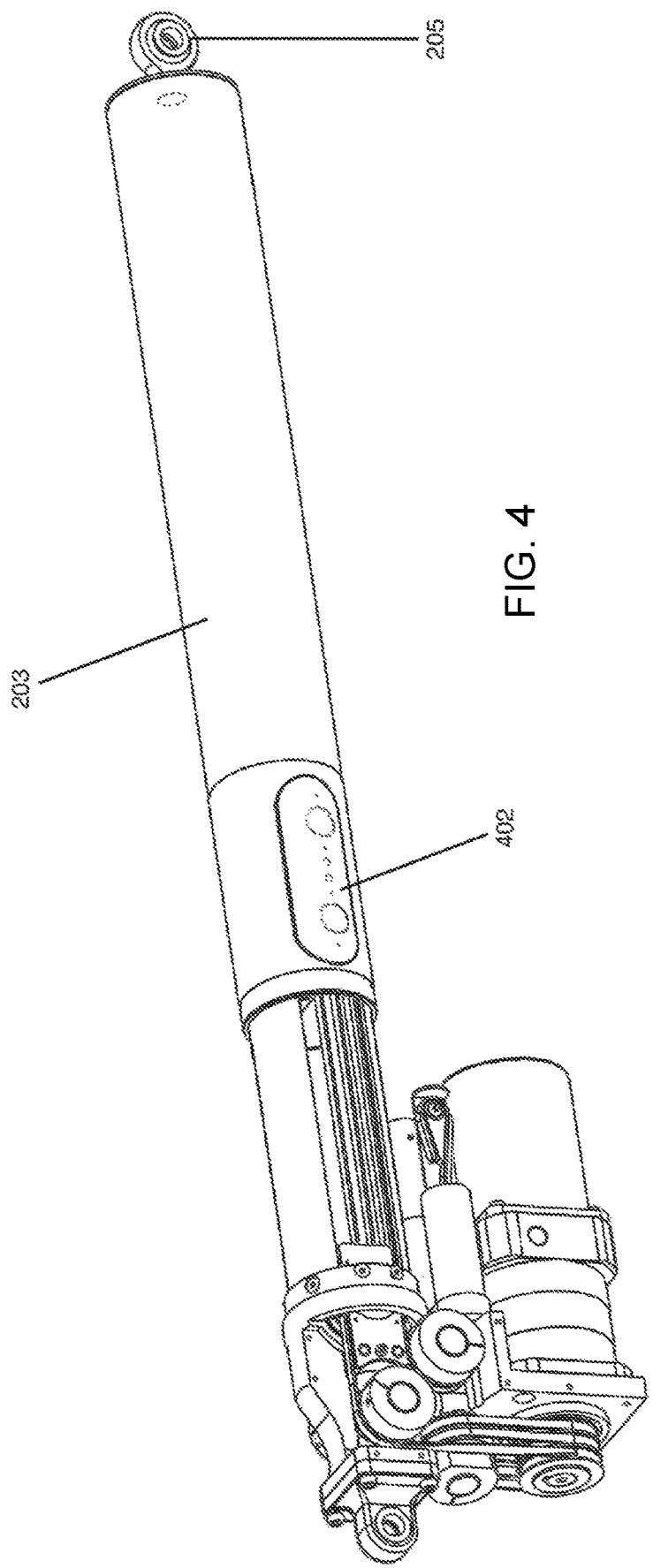
FIG. 4 is an exemplary illustration of the output rod connections of the actuator.

FIG. 4 illustrates the structure involved in transmitting an axial load from the mounting hardware 205 to the inner drive shafts 302 and 303. The output shaft 203 can be configured as a hollow shaft. The output shaft 203 connects the mounting hardware 205 to the inner drive shafts 302 and 303 by means of rigid inserts 402, rendering a fixed assembly of components that constitutes the power frame.

Figure 5:
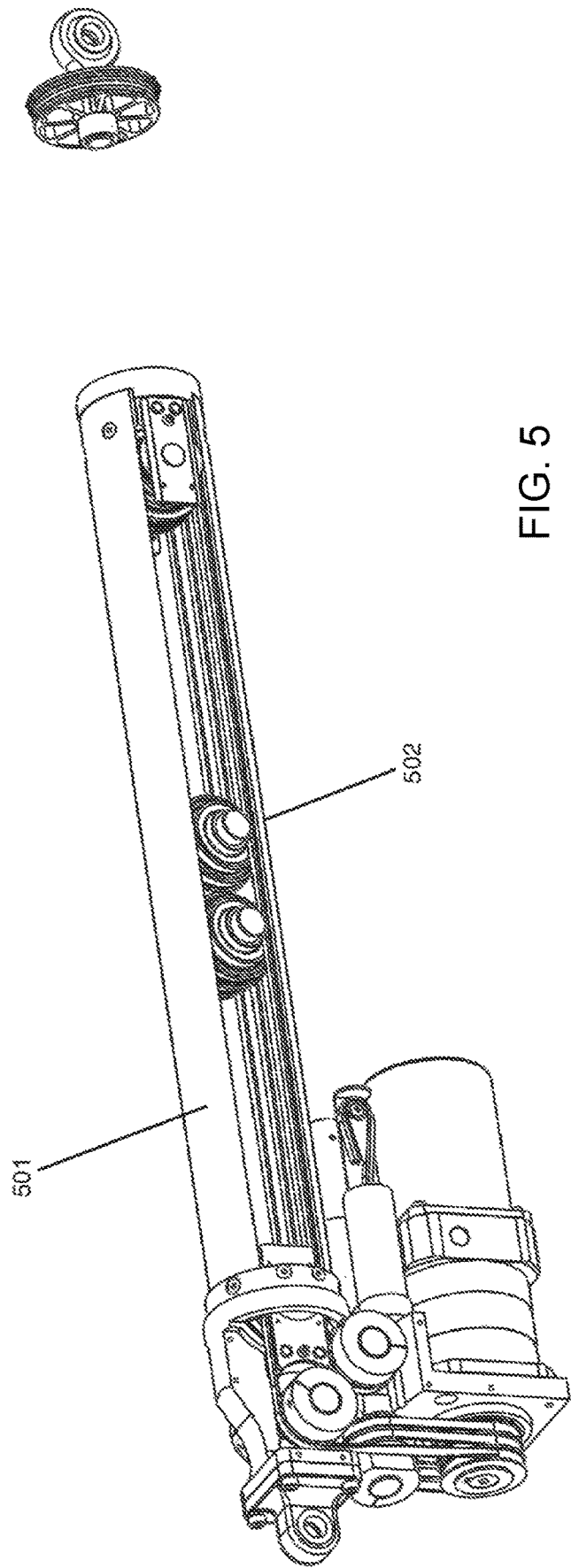
FIG. 5 shows a detailed isometric view of the main structural elements of the actuator.

FIG. 5 presents the structure associated with the fixed frame. Semi-circular members 501, 502 are components of the outer chassis 202 that connect the outer drive shaft 304 to the rest of the chassis base. Thus, tension can be generated in both directions between the fixed shafts 304 and 305 and the power frame shafts 302 and 303, which move with respect to the fixed shafts 304 and 305 and with respect to and within the outer chassis 202.

Figure 6:
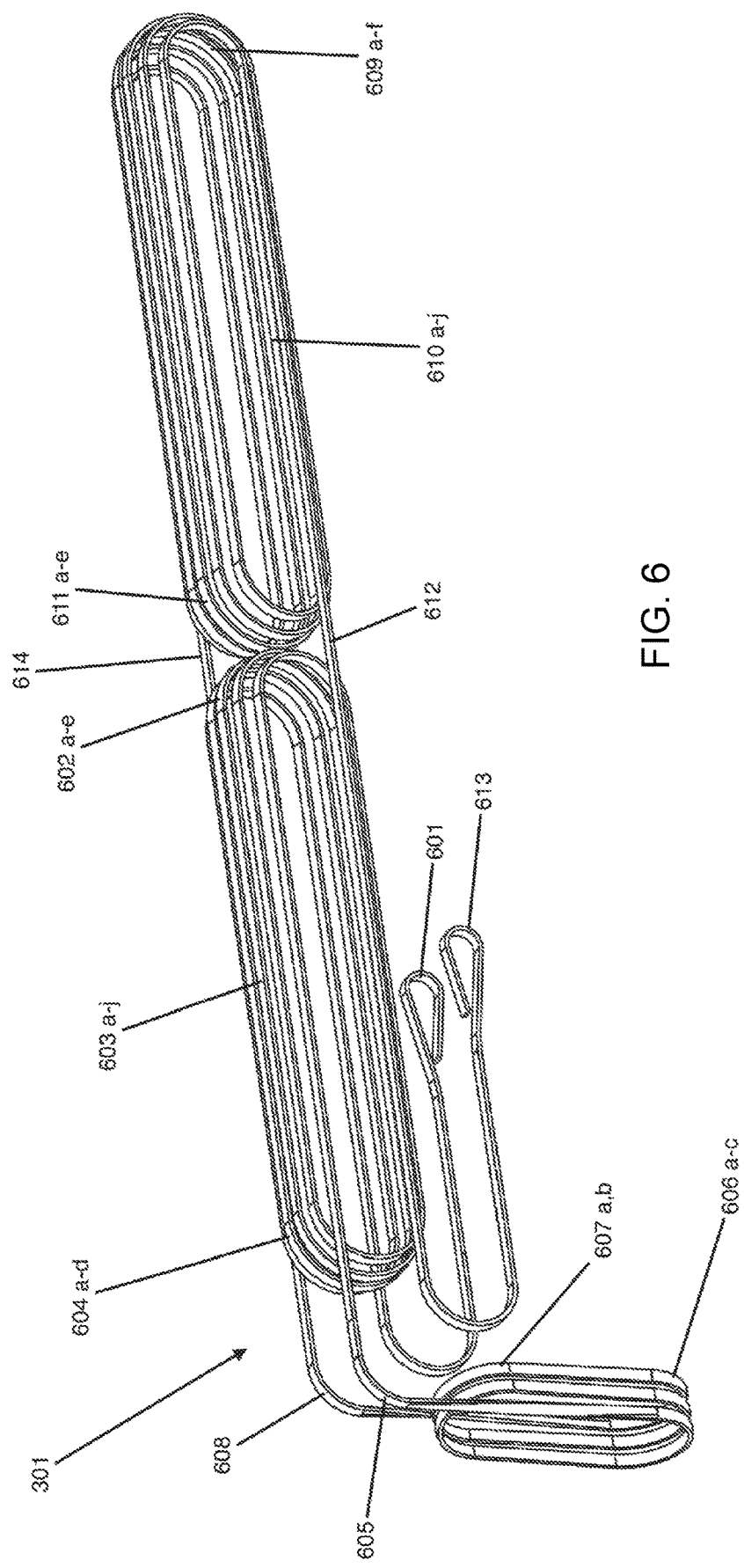
FIG. 6 presents an isometric view of the isolated belt topology.

FIG. 6 illustrates the belt topology in its entirety. A single flat belt body 301 begins at a wedge termination geometry 601 that is nearly fixed with respect to the outer chassis 202. The belt 301 is wound over a plurality of sheaves 308, rotatably coupled to shaft 302, and is wound over a plurality of sheaves 311, rotatably coupled to shaft 305, causing the arced belt geometries 602 a-e and 604 a-d. Free spans 603 a-j join the arced sections of belt in order to fully constitute a block and tackle arrangement. The belt is then wound over a redirection sheave to form an arc 605 that leads to the drive unit. The drive unit is a friction drive component, consisting of a friction drum and an idler that opposes it. Multiple belt sections 606 a-c reside on the traction drum 1501, while additional arc sections 607 a, b reside on an idler 1503 that rotates freely. Exiting the drive unit, the belt arc 608 provides redirection along span 614 to the opposite block and tackle where it is wound around two pluralities of sheaves 309 and 310 that are freely rotatable about shafts 303 and 304, respectively. These form arc sections 609 a-f and 611 a-e, connected by free spans 610 a-j. Exiting the second block and tackle, the belt runs along free span 612, which leads to wedge termination point 613.

Under running conditions, one block and tackle expands, while the other contracts. The tension differential between the two sets is equivalent to the external load imposed upon the system, and the difference in belt tension from the high-tension side to the low-tension side is supplied by a friction drive, which will be described later. It should be noted that in this exemplary embodiment of the invention, two block and tackles oppose each other for bi-directional load capability. Other embodiments of the invention that require single-acting capability may only require one block and tackle (see, FIG. 18), with excess belt that is released from the capstan drive being driven into a low tension take-up reel.

Figures 7A, 7B, 7C:
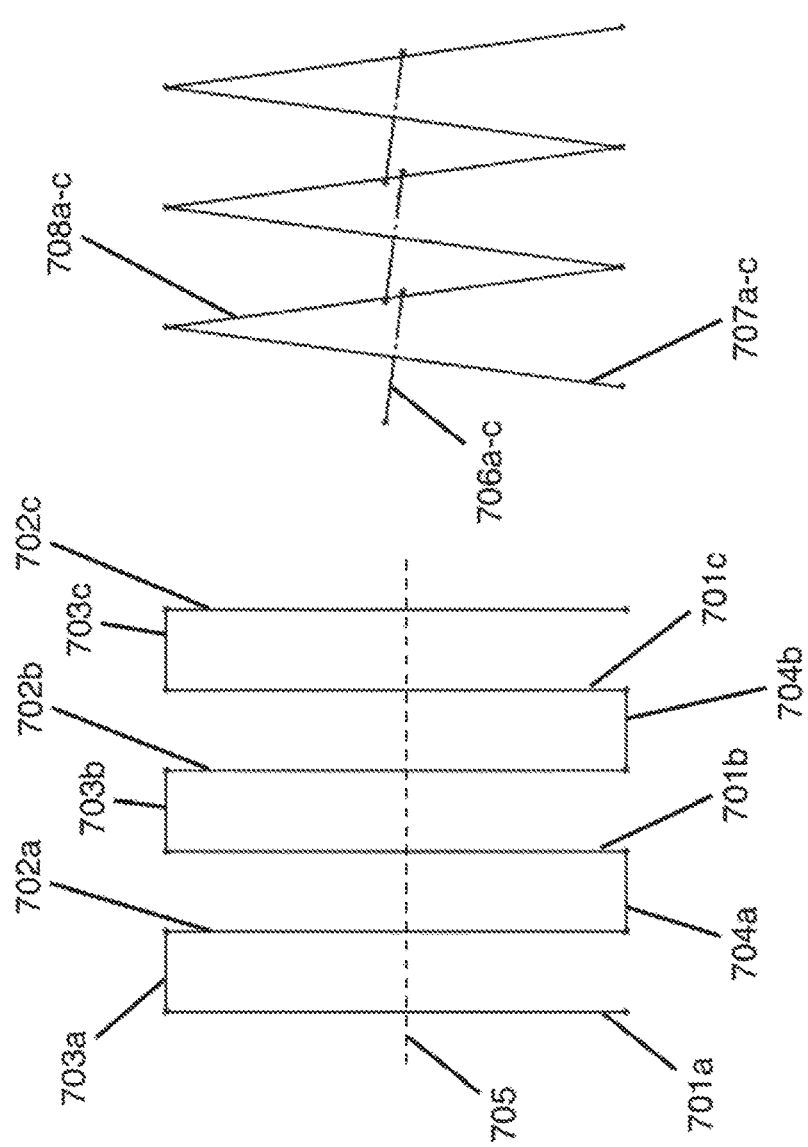
FIGS. 7A-7C are an exemplary illustration of the geometric technique used to prevent fleet angles in the free spans of the block and tackle. The point of view is taken to be along the main axis of the drive.
Figure 7D:
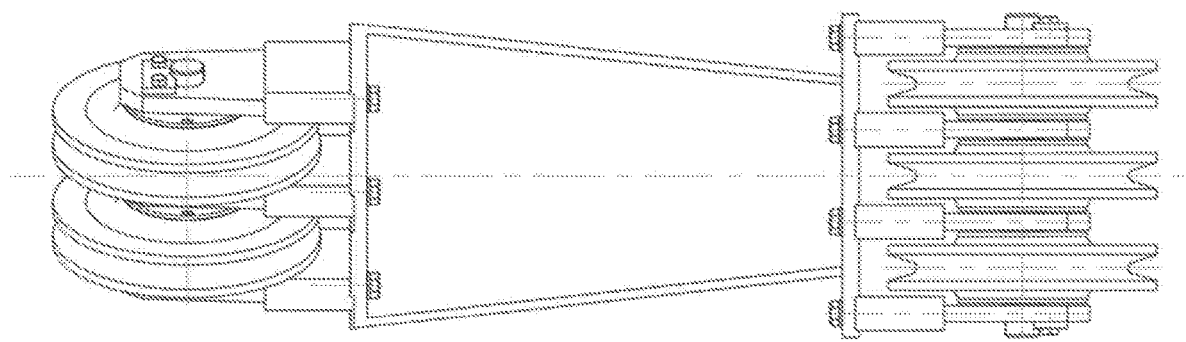
FIG. 7D-7E illustrates a machine design that avoids fleet angles via methods of the prior art.
Figure 7E:
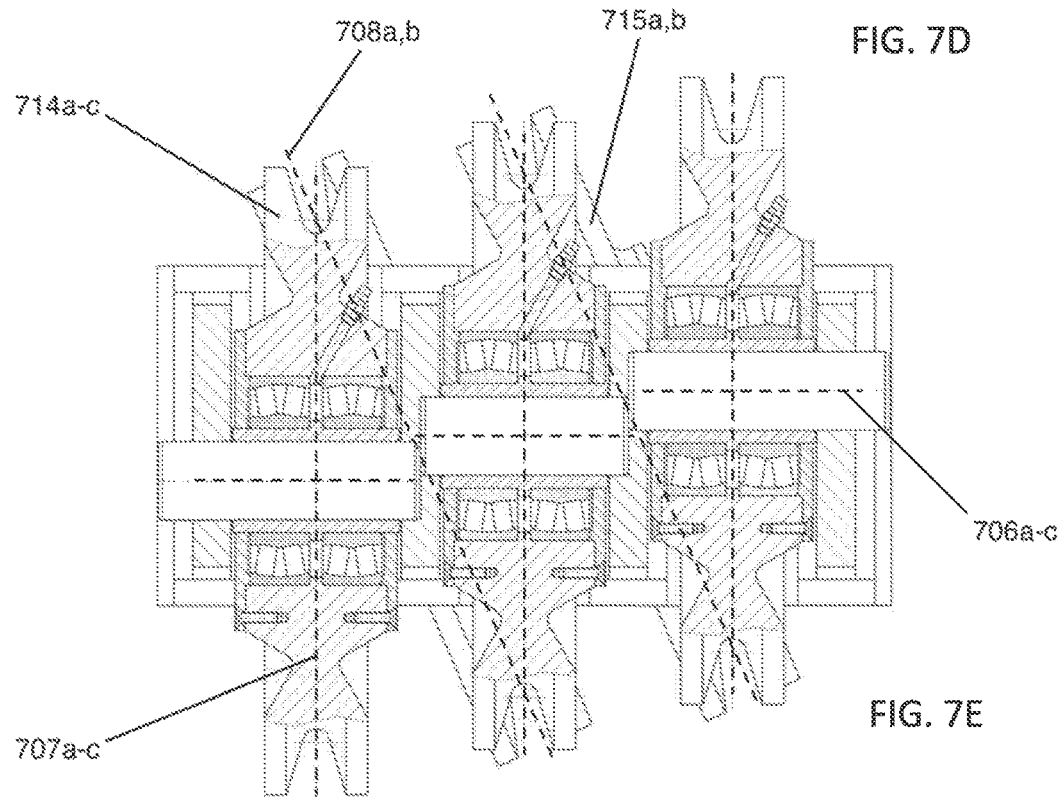

FIGS. 7A-7B are exemplary illustrations of the geometric technique used to prevent fleet angles in the block and tackle arrangement. In this figure, we are looking down the principal motion axis of three distinct block and tackle species with the centerline of the belt or rope illustrated in each case. FIG. 7A represents a conventional block-and-tackle arrangement. FIG. 7B presents a modified block-and-tackle design that eliminates fleet angles via a simple tilt method. FIG. 7C represents the geometric mapping technique herein described that allows for common axes of both sets of sheaves while also eliminating fleet angles. FIG. 7D-7E present a machine design based on the technique depicted in FIG. 7B.

A conventional block and tackle similar to that which is depicted in FIG. 1 will have a projection similar to the left-most illustration, consisting of two sets of sheaves of equal diameter that reside on axes 705 which are parallel and from the mentioned projection angle will appear to be coincident. The first set of sheaves will render arced sections of the flexible tensile member which when seen from the projection of the axis mentioned will appear as vertical lines 701 a, b, c. Note that only six free spans are illustrated here for the purpose of simplicity. The second set of sheaves will render arced sections of the flexible tensile member's centerline which when seen from mentioned projection angle will appear as vertical lines 702 a, b, c. Free spans 703 a, b, c run from the first set of sheaves to the second set of sheaves, and free spans 704 a, b run from the second set of sheaves back to the first. These free spans, analogous to the free spans 128 from FIG. 1, are not parallel to the main axis and thus have a lateral component that can be seen from this perspective. The presence of this lateral component is indicative of the fleet angle that is evident at any entry point into a sheave.

To adapt a block-and-tackle for use with a flat belt, we must get rid of the fleet angles. This is readily accomplished by simply tilting each of the sheaves and their corresponding belt arcs 707 a-c as per FIG. 7B and FIGS. 7D and 7E, such that the horizontal aspect of the free span shrinks to zero.

In this species, all sheaves are tiled by the same angle such that fleet angles disappear. The opposing set of sheaves will create centerline projections 708 a-c. This accomplishes a zero-fleet angle condition, but renders the rotation axes 706 a-c of the sheaves to be no longer coincident. Thus, a supporting shaft would have to have multiple non-coincident shaft sections that support the sheaves.

FIGS. 7D and 7E depict a machine design that is based upon this principle of fleet angle elimination. As can be seen, the supporting shafts (with centerlines 706ac) are not coincident with each other on either end of the block and tackle. This machine, designed by Roland Verreet and Jean-Marc Teissier, tests bending fatigue in wire rope samples. By cleverly controlling the amount of stroke, certain sections of rope are subjected to an array of fractions of the maximum number of bending cycles. Thus, by running the machine just once, an operator can ascertain the condition of wear of the rope at 20%, 40%, 60%, 80%, and 100% of the maximum number of bending test cycles. In the case of this machine, the additional machine width generated by the method of fleet angle elimination is acceptable, and the sheaves are by necessity the same size for the purposes of comparable testing information.

The present invention does not require the sheaves to be of exactly the same size, and it is of paramount importance that the overall machine compactness and the continuity of support shafts is maintained. This is accomplished in the illustration of FIG. 7C. The geometry can be found via a mapping technique, starting with the sheave axes 709 and 710, which reside on opposite ends of the block and tackle. An initial sheave dimension 711a and its axial span positions is drawn on its axis 710 first, with each subsequent centerline arc (712a, then 711b, 712b, 711c, 712c, and so on) being defined by its predecessor and its perpendicularity and centeredness on its own shaft. There is only one geometric solution to the sheave set given a set of sheave axes 709, 710, an initial centerline arc geometry 711a, and a number of sheaves to generate. The resultant planar locations of the free span centerlines as seen from this perspective reside along a circular profile 713 with the additional constraints mentioned. Spacing between parallel sheaves is necessarily non-constant and decreases as the sheaves decrease in diameter toward the peripheries.

Figure 8:
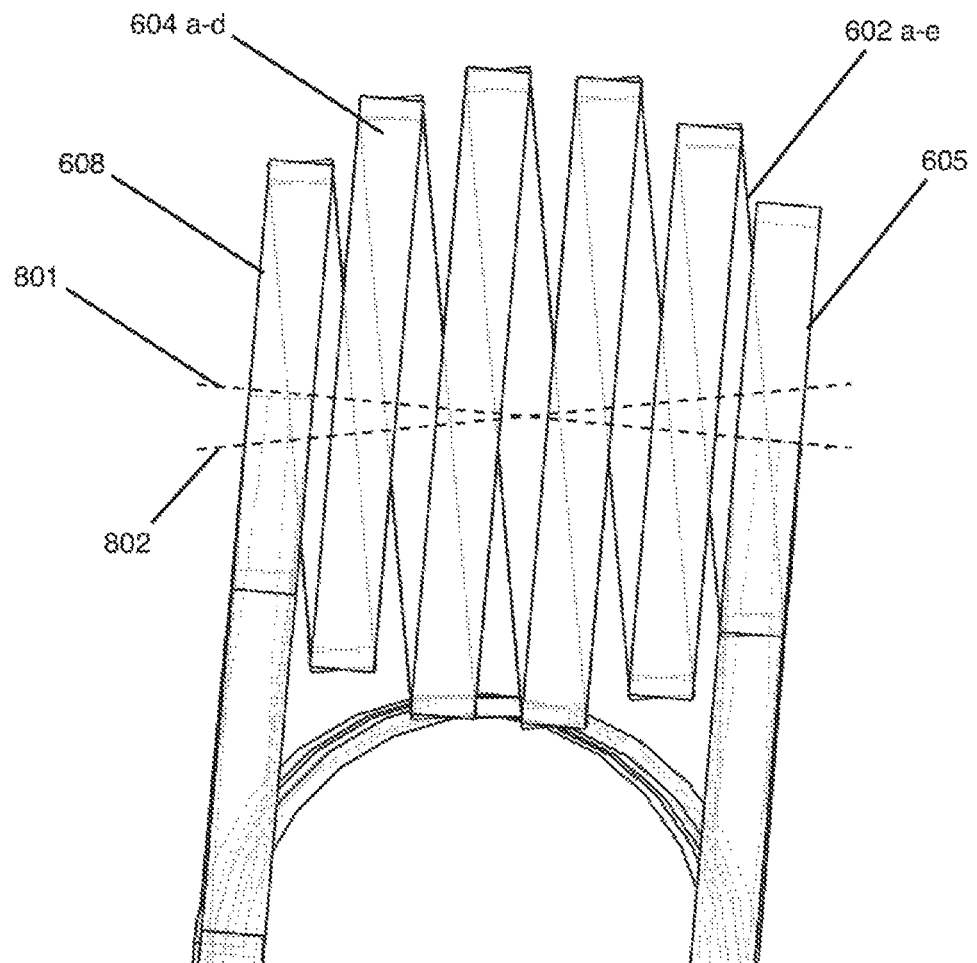
FIG. 8 depicts an axial view of the belt topology.

FIG. 8 shows an axial view of the belt topology, highlighting the rotational axis 801 of outer shaft 305 and its respective set of freely rotating sheaves 311. Belt sections 604 a-d reside on the plurality of sheaves 311, in accordance with the positions shown in FIG. 7.

The plurality of sheaves 308 rotates freely about shaft 302, with its axis 802. Belt sections 602 a-e reside on the plurality of sheaves 308 in accordance with the positions depicted in FIG. 7.

Figure 9:
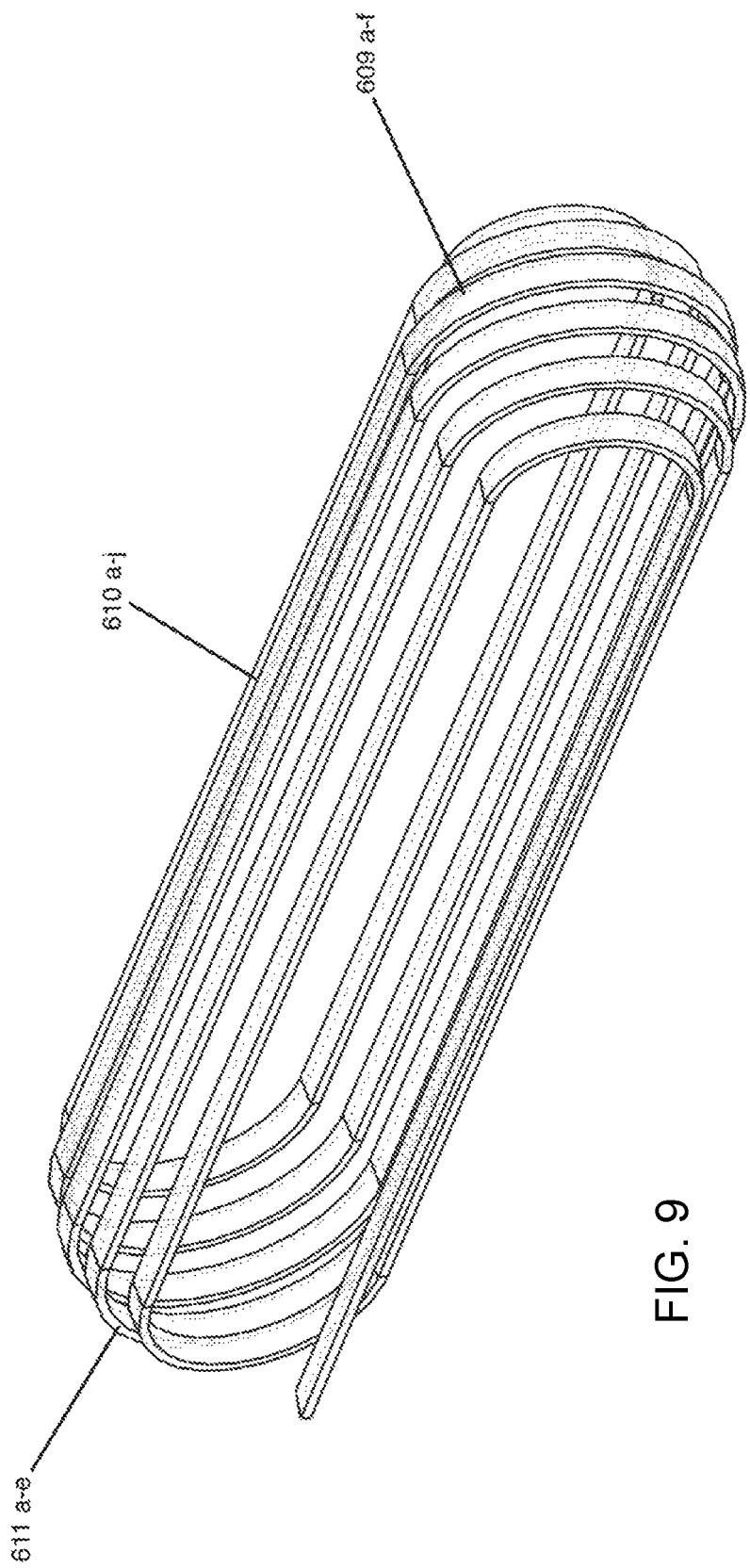
FIG. 9 shows an isometric view of an isolated belt-based block and tackle.

FIG. 9 shows an isometric view of a complete block and tackle topology. Arced geometries 609 a-f and 611 a-e are joined by free spans 610 a-j.

Figure 10:
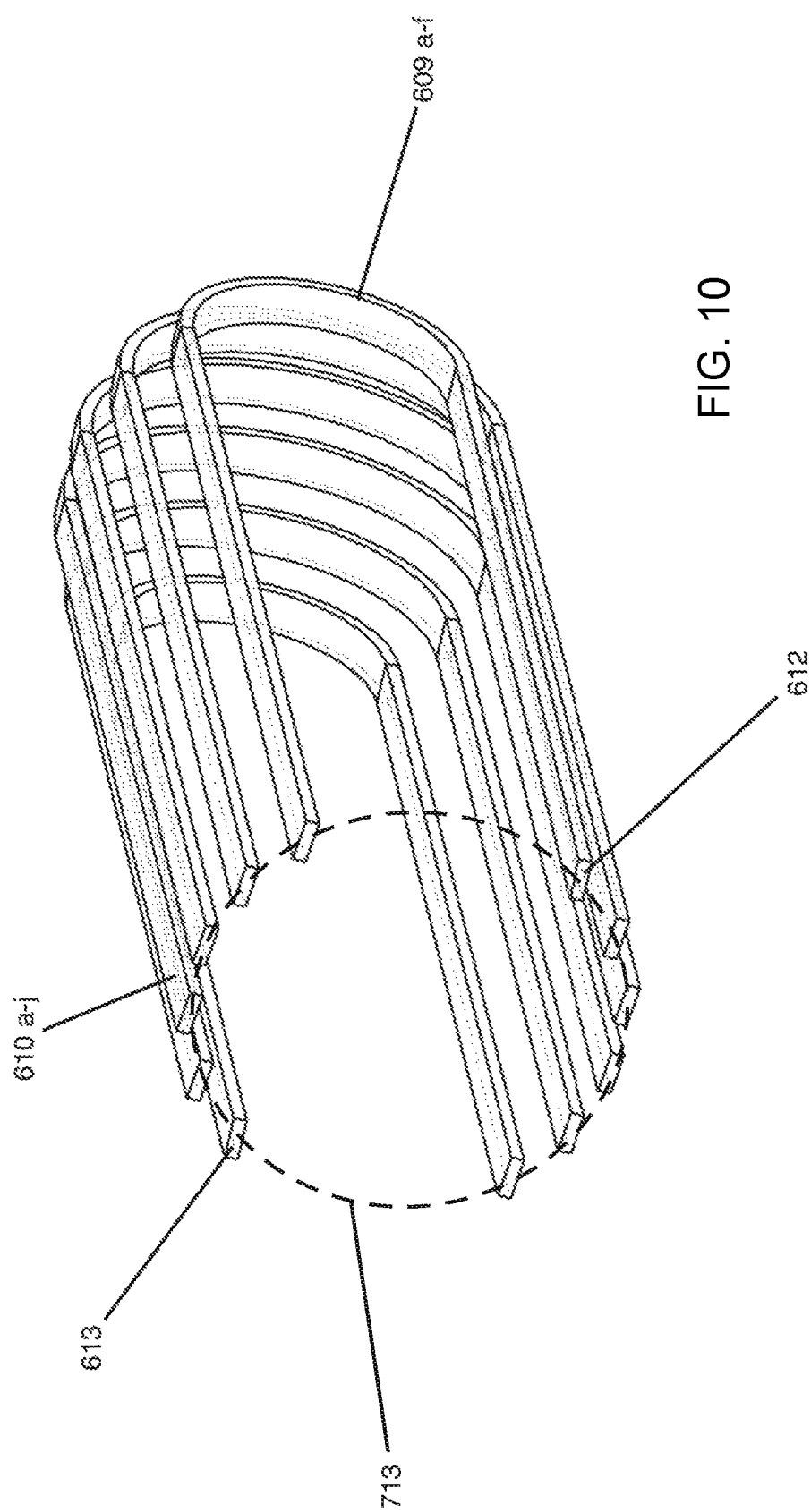
FIG. 10 depicts an isometric view of a cross section of an isolated belt-based block and tackle.

FIG. 10 shows a cross section of the block and tackle topology, including the free spans 612 and 614, which lead to wedge termination 613 and redirection bend 608, respectively. Circular profile 713 is drawn, intersecting the centerpoint of each belt segment in the cross section.

Figure 11:
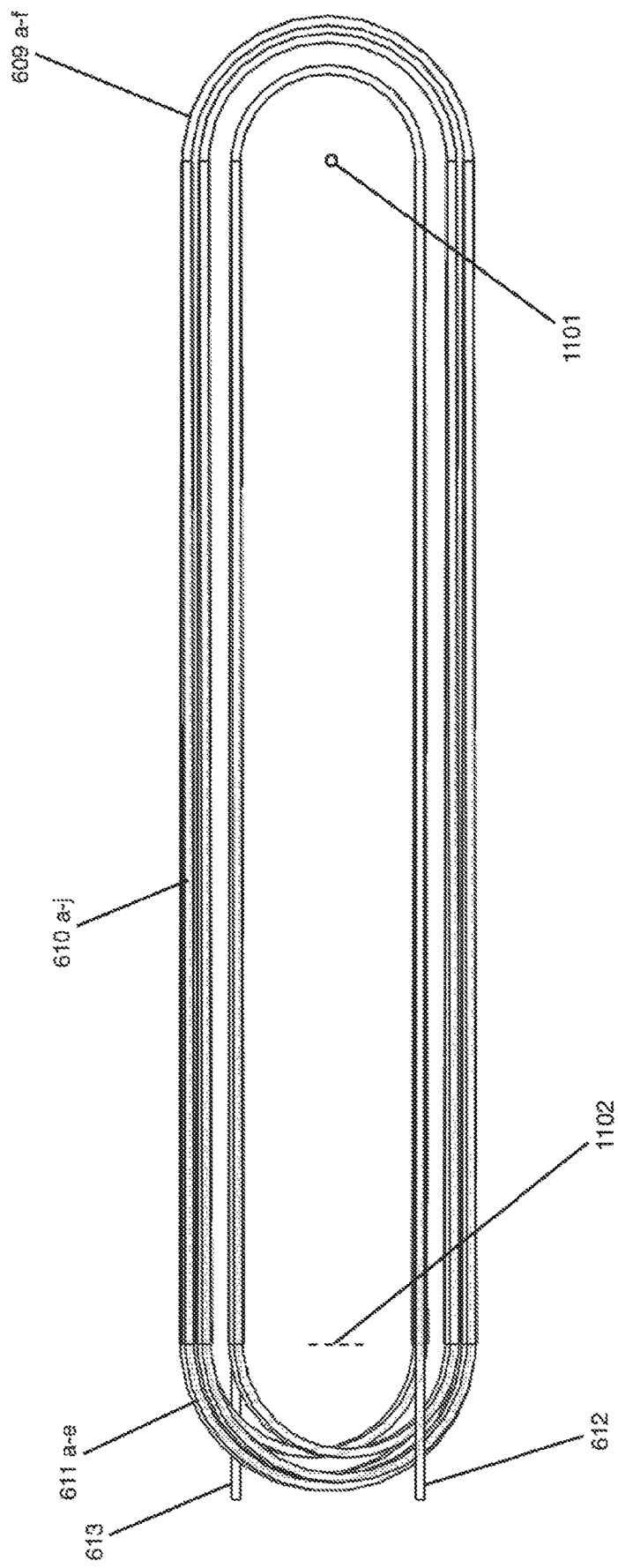
FIG. 11 shows a side view of the belt-based block and tackle, perpendicular to the axis of the right hand sheave set.
Figure 12:
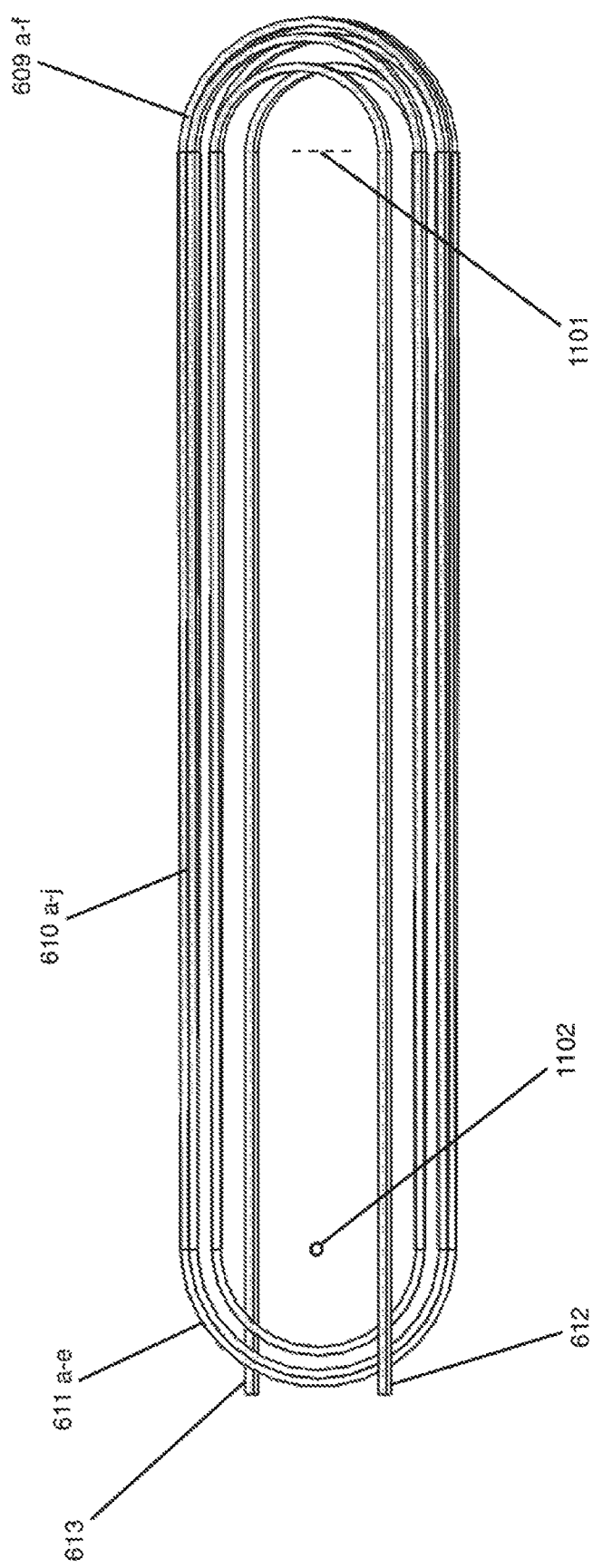
FIG. 12 shows a side view of the belt-based block and tackle, perpendicular to the axis of the left hand sheave set.

FIG. 11 and FIG. 12 offer side views of the block and tackle topology for clarity.

Figure 13:
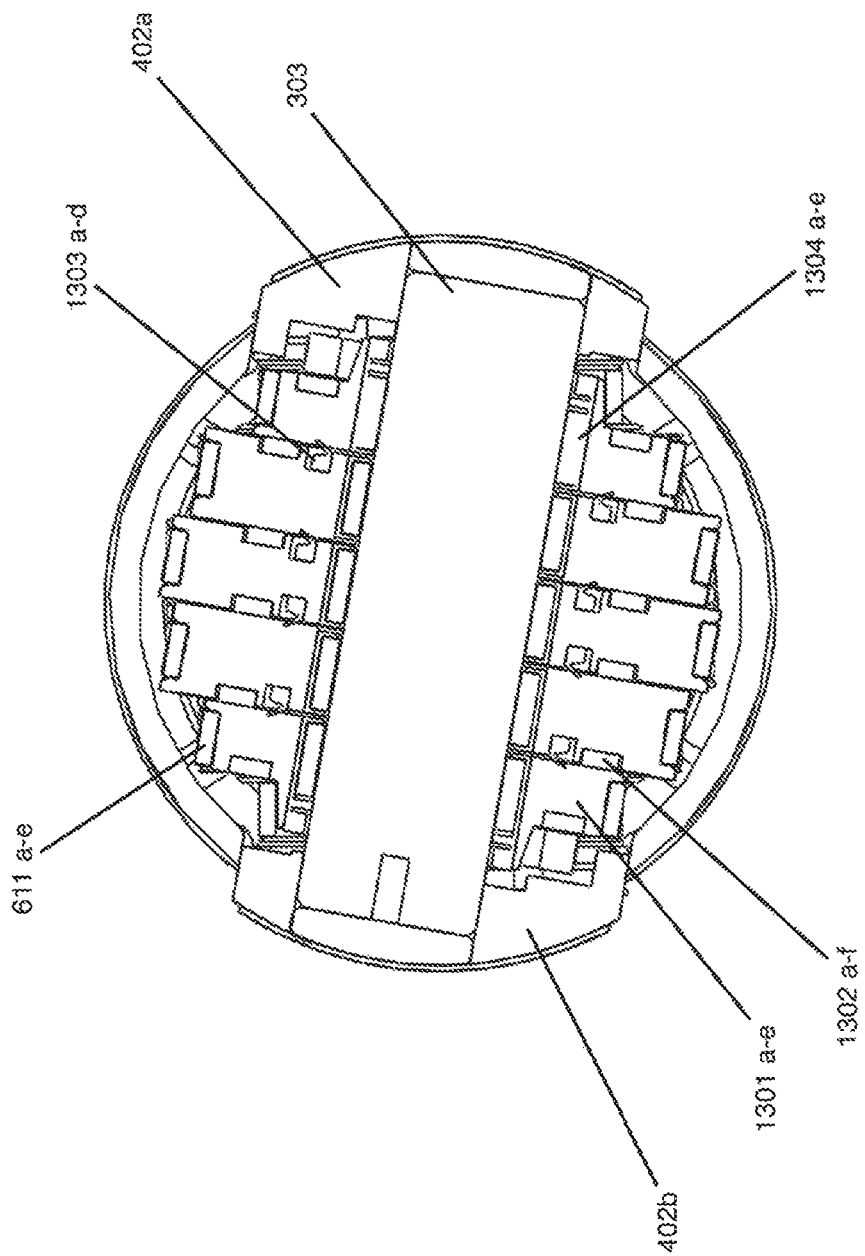
FIG. 13 presents the cross section of a sheave set that supports the belt. The point of view is taken to be along the main axis of the drive.

FIG. 13 illustrates a cross section of the plurality of sheaves 308, which consists of five individual sheaves 1301 a-e, all of which rotate at different speeds and are freely rotating about shaft 303. The sheaves have separating thrust washers 1302 a-f that allow for a compressive axial load of the sheave stack. Seals 1303 a-d maintain the greased bearing volume and exclude possible contaminants. Belt segments 611 a-e reside on the plurality of sheaves 308.

Output rod inserts 402a and 402b provide a mechanical connection between the power frame shafts 302,303 and the output rod 203.

Figure 14:
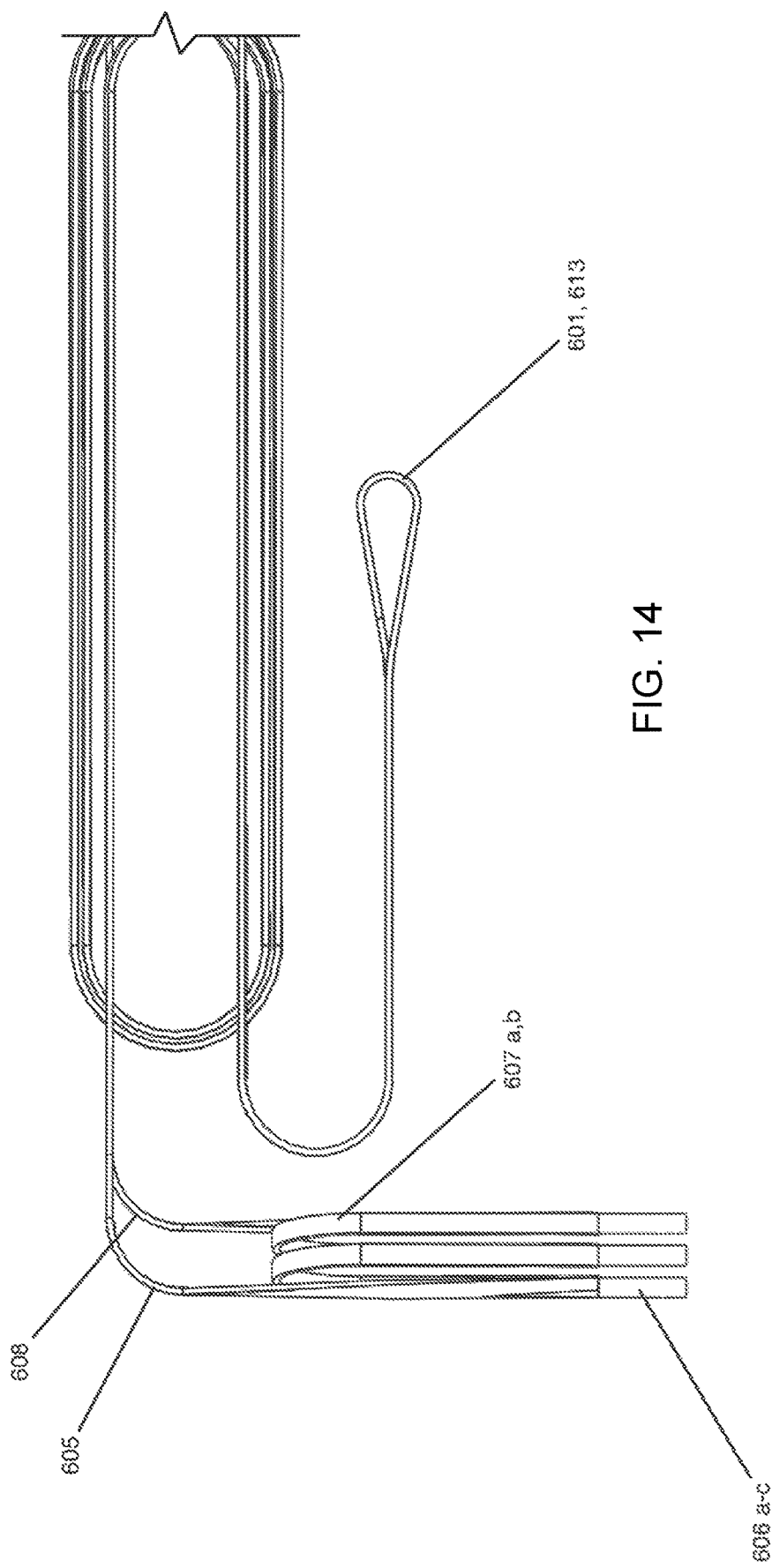
FIG. 14 illustrates a side view of the belt topology near the motor end of the drive.

FIG. 14 depicts a side view of the belt topology in the vicinity of the driving motor for clarity.

Figure 15:
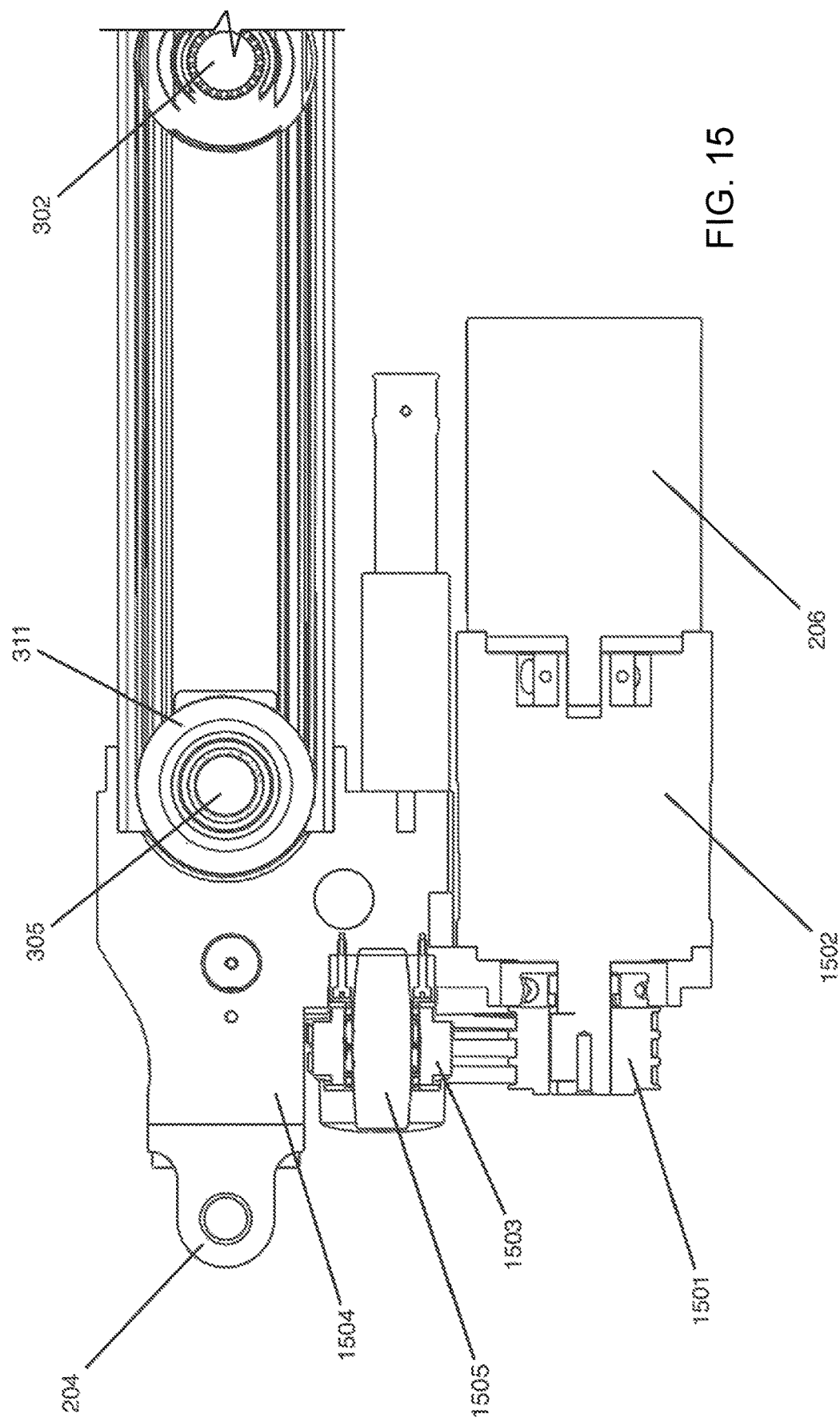
FIG. 15 shows a side view of the actuator in cross section.

FIG. 15 shows the supporting structure of many components in cross section. The motor 206 and its gearbox 1502 are fixed to the traction drum 1501, which drives belt segments 606 a-c. Belt segments 607 a, b reside on idler drum 1503, which is freely rotatable about its support shaft 1505. The base frame 1504 fixes these components in place.

Figure 16:
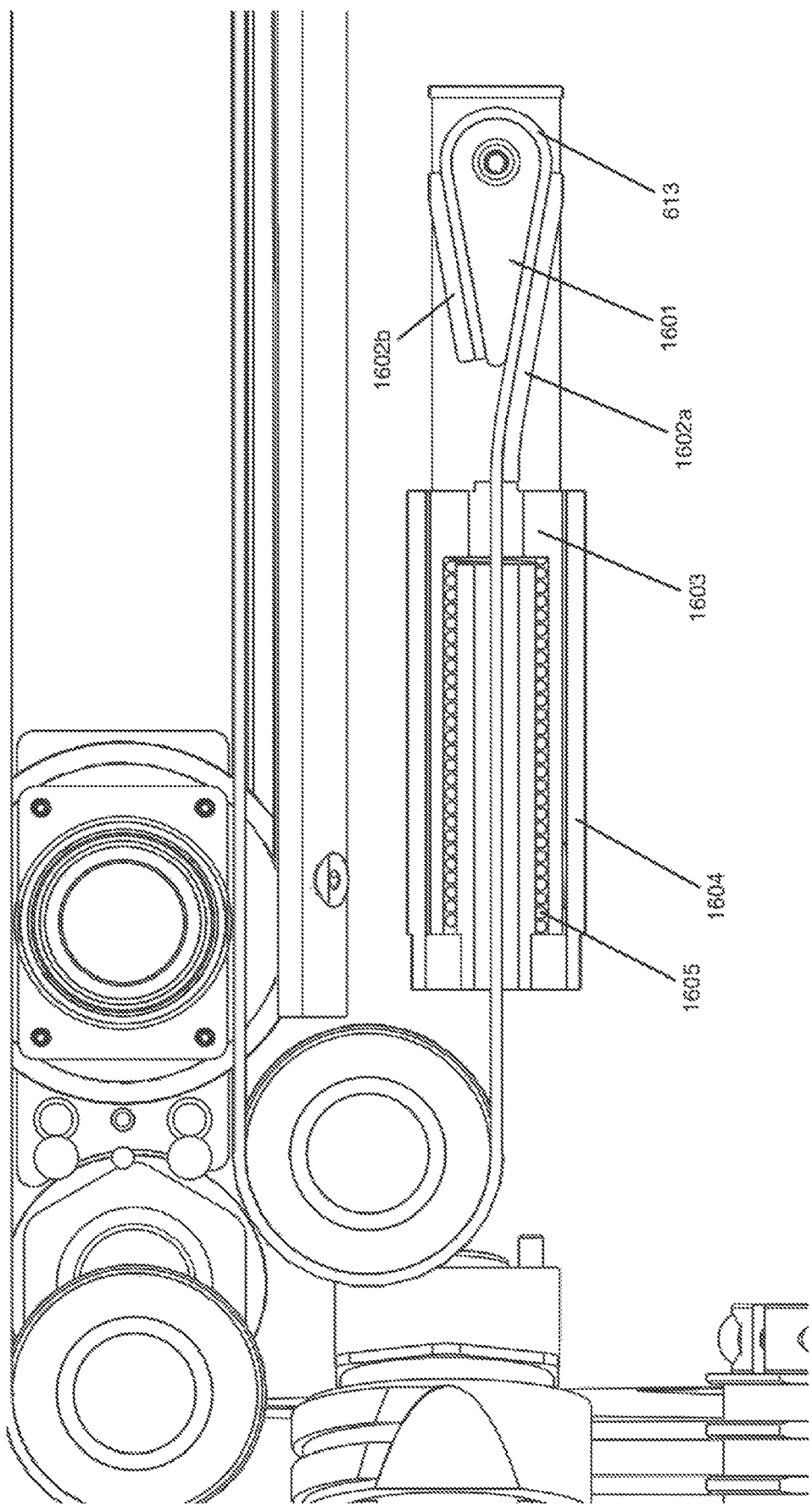
FIG. 16 is an exemplary illustration of the means of termination of the belt ends and the belt tension maintenance mechanism.

FIG. 16 illustrates a cross section view of the tensioning mechanism for the terminations of the belt. Belt wedge geometry 613 is compressed between wedge 1601 and support walls 1602 a, b. The support walls 1602 a, b are part of the termination body 1603, which is compressing a compression spring 1605 against the termination housing 1604. An idler pulley is used to change a direction of the belt from the termination point toward the sheaves. The termination housing 1604 is affixed to the base frame 1504. In normal operation, the termination body 1603 compresses against the base frame 1504 as high tension is developed in the belt. If low belt tension develops during operation, the compression spring 1605 forces the termination body 1603 outward, maintaining belt tension at all times and allowing the traction drum 1501 to function by doing so.

Figure 17:
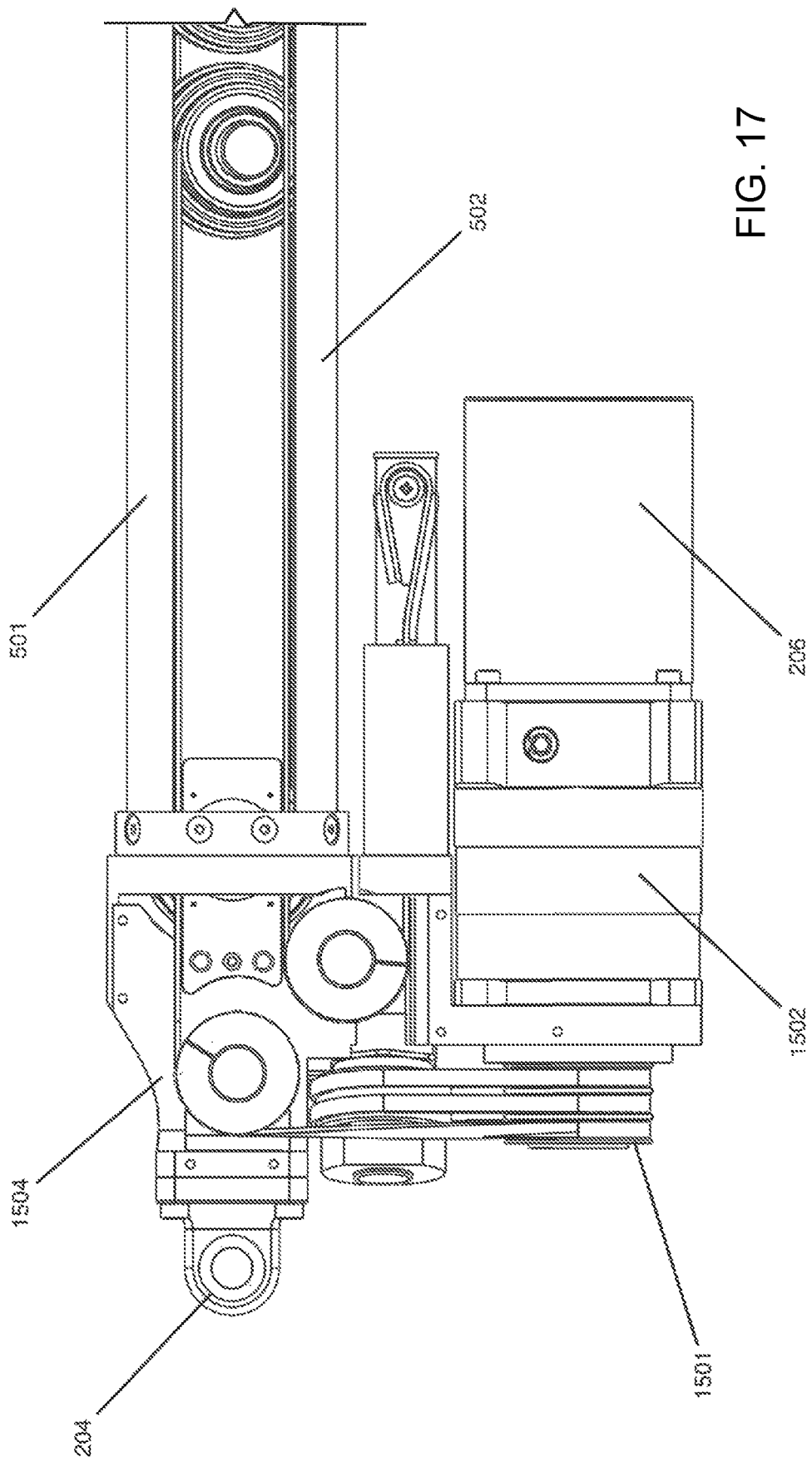
FIG. 17 shows a side view of the actuator.

FIG. 17 illustrates a complete side view of many base components for clarity.

Figure 18:
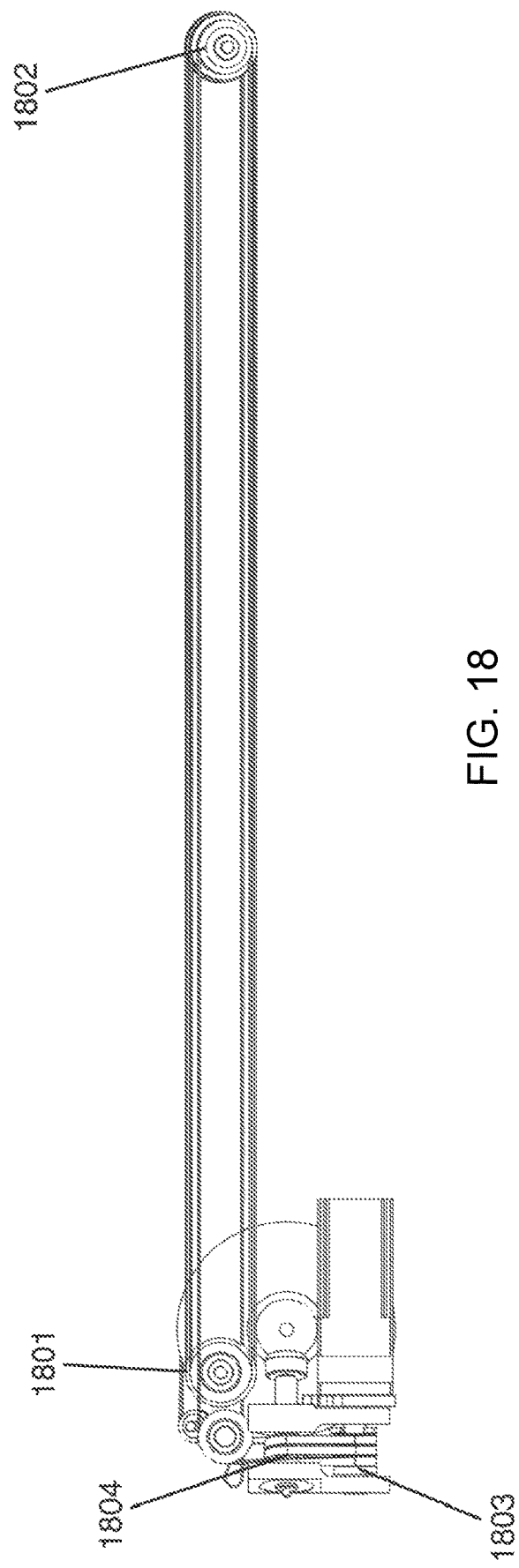
FIG. 18 illustrates a separate species of the invention acts in tension only.

FIG. 18 shows an alternate species of the invention that relies on just one set of block and tackle. The belt, after exiting the first block and tackle and the drive unit, is spooled onto a reel. The plurality of sheaves 1801 is analogous to sheave set 311, and plurality of sheaves 1802 is analogous to sheave set 310. Drive sheave 1803 is analogous to drive sheave 1501 from the previous species, and idler sheave 1804 is analogous to idler sheave 1503.

Figure 19:
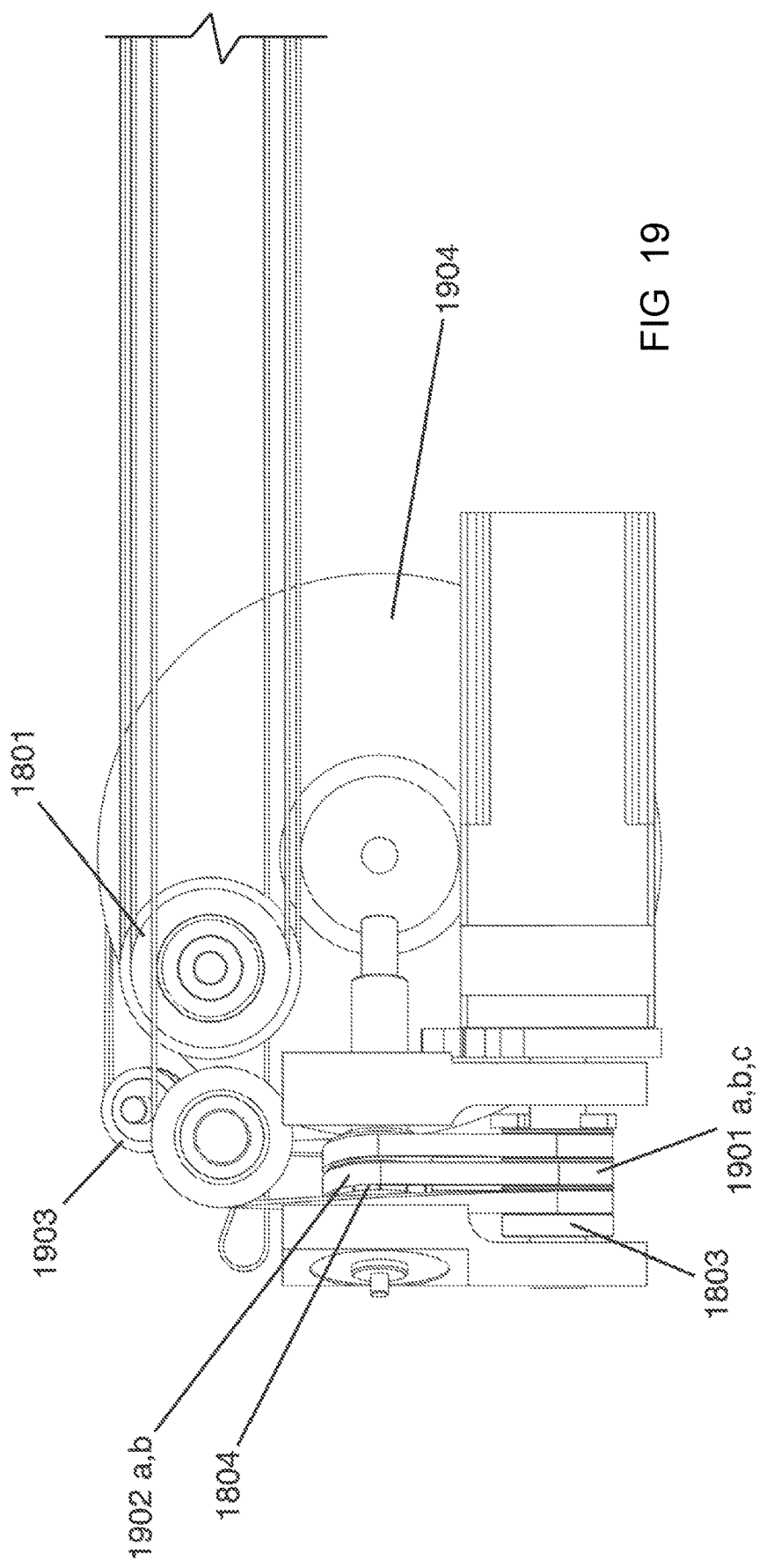
FIG. 19 provides a close-up of the frame structure of the separate species.

FIG. 19 presents a detailed view of the drive elements. The belt topology remains identical through the first block and tackle, the redirection sheave, and the drive unit. Belt arc segments 1901a-c are analogous to belt arc segments 606a-c, and belt arc segments 1902 a, b are analogous to 607 a, b. When the belt exits the drive area, it is redirected by sheave 1903 onto a take-up reel instead of being redirected to the opposing block and tackle. The spool 1904 may be powered by spring or by active mechanical means.

Figure 20:
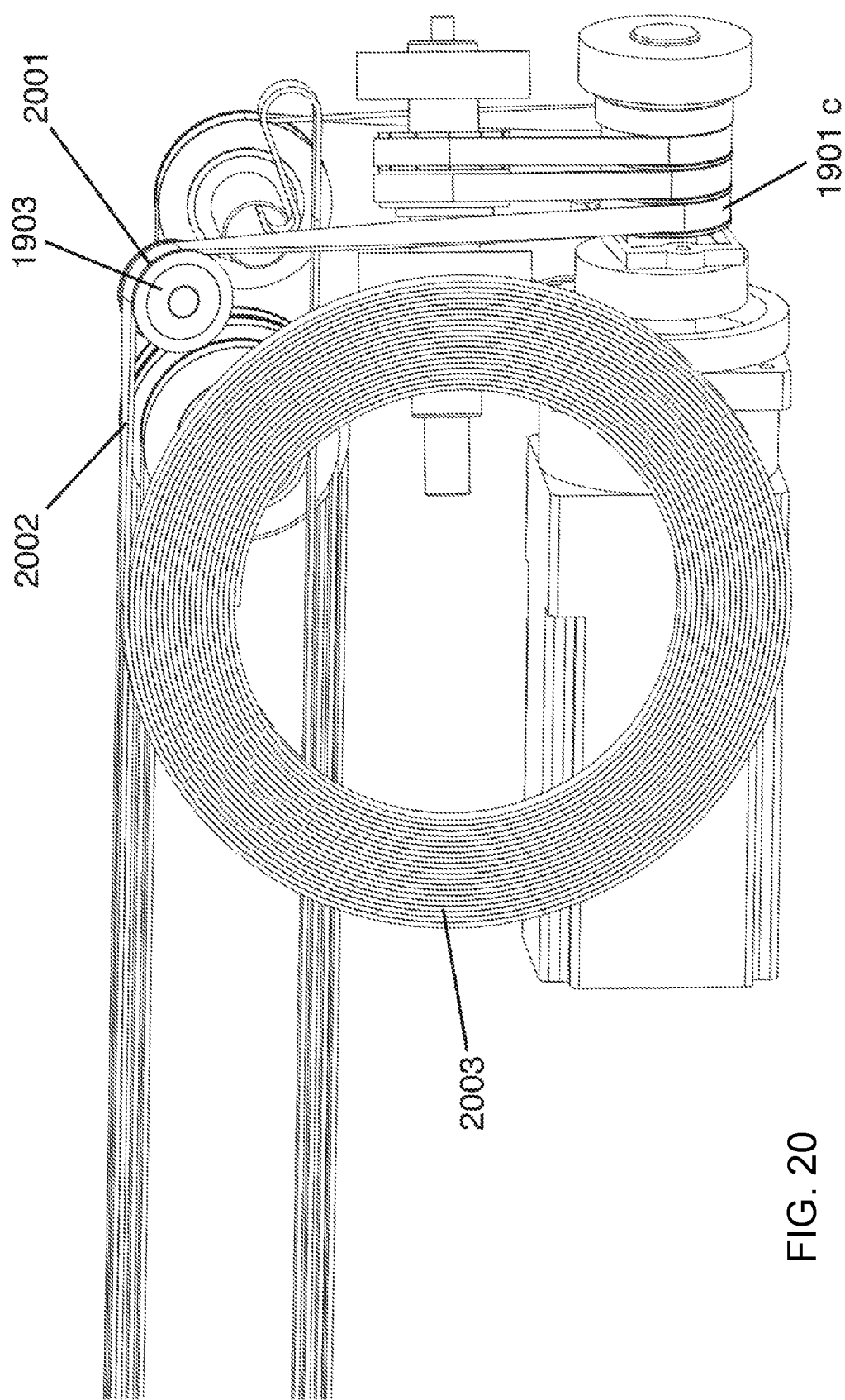
FIG. 20 shows the back side of the tension-only species of this invention, illustrating the belt topology.

FIG. 20 presents a detailed view of the belt topology of the second species of the invention. Belt arc segment 2001 resides on redirection sheave 1903, with free span 2002 leading to the spooled belt 2003.

Figure 21:
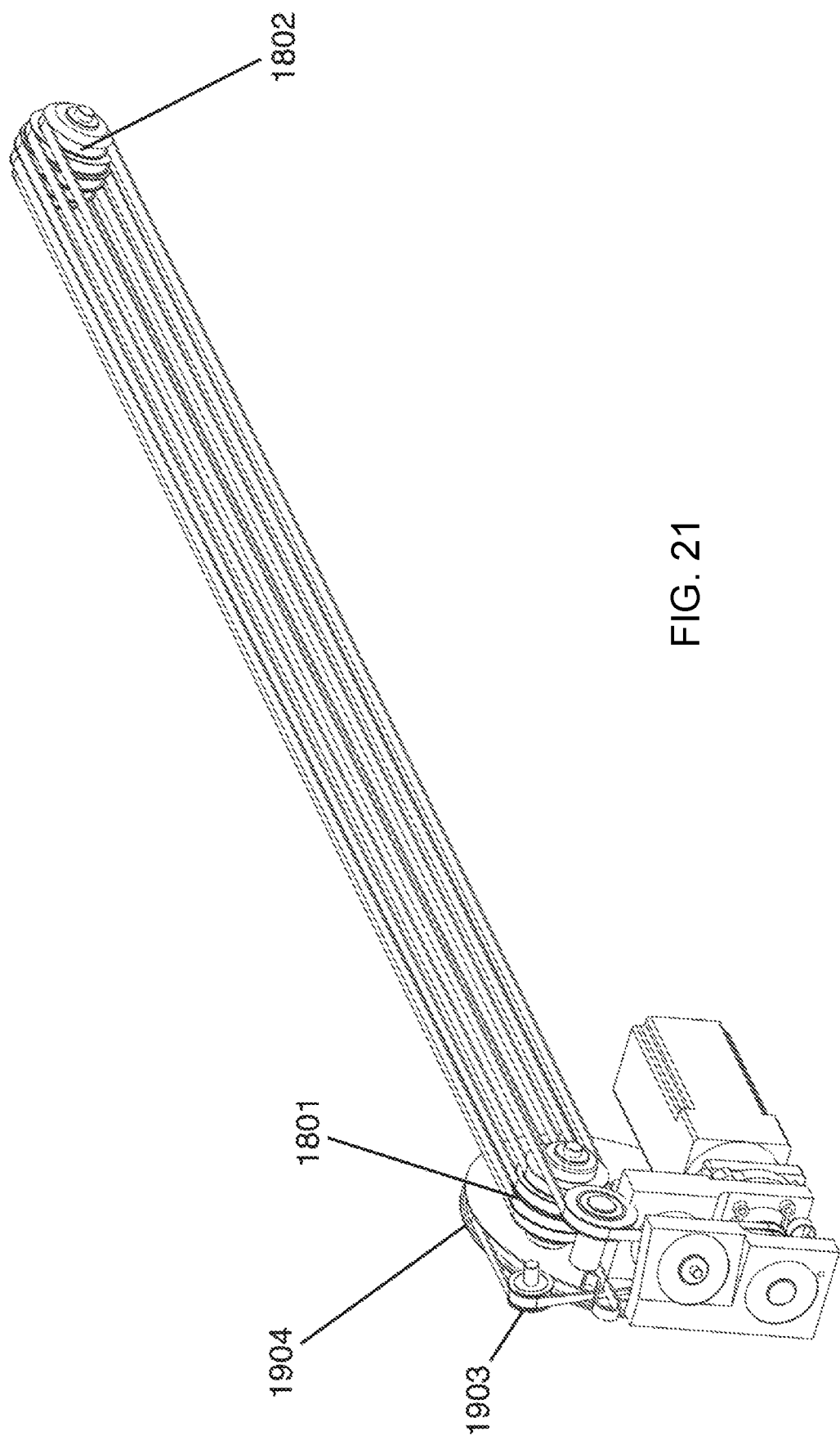
FIG. 21 shows a complete isometric view of a tension-only implementation of this invention.

FIG. 21 shows an isometric view of the second species. Free spans 2100a-j support the tensile load through the actuator, similar to any other block and tackle based lifting apparatus. The belt is driven through the capstan friction-based drive unit comprised of drive sheave 1803 and idler sheave 1804. After exiting the drive unit, the belt is redirected by sheave 1903 to the reel 1904 for storage at low tension. The majority of the power flow through the system goes through the capstan drive sheave 1803 and into the rotary actuator.

As utilized herein, the terms "approximately," "about," "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described without restricting the scope of these features to the precise numerical ranges provided. Accordingly, these terms should be interpreted as indicating that insubstantial or inconsequential modifications or alterations of the subject matter described and are considered to be within the scope of the disclosure.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It should be noted that the orientation of various elements may differ according to other exemplary embodiments, and that such variations are intended to be encompassed by the present disclosure. It is recognized that features of the disclosed embodiments can be incorporated into other disclosed embodiments.

It is important to note that the constructions and arrangements of spring systems or the components thereof as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

All literature and similar material cited in this application, including, but not limited to, patents, patent applications, articles, books, treatises, and web pages, regardless of the format of such literature and similar materials, are expressly incorporated by reference in their entirety. In the event that one or more of the incorporated literature and similar materials differs from or contradicts this application, including but not limited to defined terms, term usage, describes techniques, or the like, this application controls.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of" or "exactly one of"

"Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed is:

1. A method of manufacturing a belt driven linear actuator system, the method comprising:
    movably coupling an actuation shaft to an actuator chassis; the actuation shaft movably coupled to the actuator chassis to translate along a main drive axis;
    coupling a first plurality of sheaves to the actuator chassis, the first plurality of sheaves coupled to the actuation chassis via a first shaft, the first plurality of sheaves configured to rotate freely about the first shaft, the first shaft rotatably coupled to the actuator chassis and fixed in position with respect to the actuator chassis, wherein the sheaves in the first plurality of sheaves have different sheave diameters with respect to one another; and
    coupling a second plurality of sheaves to the actuator chassis, the second plurality of sheaves coupled to the actuation chassis via a second shaft, the second plurality of sheaves configured to rotate freely about second shaft, the second shaft configured to translate along the main drive axis in the actuator chassis to drive the actuation shaft, wherein the sheaves in the second plurality of sheaves have different sheave diameters with respect to one another, and wherein the first shaft and the second shaft are oriented perpendicularly to the main drive axis and are offset with respect to one another by a rotation angle about the main drive axis.

2. The method of claim 1, further comprising extending a flat belt extending from a first termination point, to and about the first plurality of sheaves, the second plurality of sheaves, and to a second termination point.

3. The method of claim 2, wherein the second termination point is within a take-up reel.

4. The method of claim 2, further comprising coupling a driver configured to engage the flat belt.

5. The method of claim 4, wherein the driver comprises an electric motor.

6. The method of claim 4, wherein the driver comprises a capstan, and wherein extending the flat belt comprises the flat belt taking at least two turns around the capstan.

* * * * *